(12) United States Patent
Kawada et al.

(10) Patent No.: US 8,864,115 B2
(45) Date of Patent: Oct. 21, 2014

(54) VIBRATION ISOLATION STRUCTURE

(75) Inventors: Masayoshi Kawada, Yokohama (JP); Nobuaki Sato, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/582,665

(22) PCT Filed: Mar. 2, 2011

(86) PCT No.: PCT/JP2011/054780
§ 371 (c)(1),
(2), (4) Date: Sep. 4, 2012

(87) PCT Pub. No.: WO2011/108597
PCT Pub. Date: Sep. 9, 2011

(65) Prior Publication Data
US 2012/0326366 A1 Dec. 27, 2012

(30) Foreign Application Priority Data
Mar. 4, 2010 (JP) ................................. 2010-048381

(51) Int. Cl.
*F16F 7/00* (2006.01)
*F16F 1/40* (2006.01)

(52) U.S. Cl.
CPC ............ *F16F 1/40* (2013.01); *F16F 2230/007* (2013.01)
USPC ...................... 267/141; 267/141.4; 267/294

(58) Field of Classification Search
USPC ............. 267/140.1–140.4, 141.1–141.7, 152, 267/293, 294; 52/167.8; 248/634
See application file for complete search history.

(56) References Cited

U.S. PATENT DOCUMENTS

| | | | | |
|---|---|---|---|---|
| 3,997,151 | A * | 12/1976 | Leingang | 267/152 |
| 5,014,474 | A * | 5/1991 | Fyfe et al. | 52/167.8 |
| 5,339,580 | A * | 8/1994 | Koshika et al. | 52/167.1 |
| 5,676,356 | A * | 10/1997 | Ekonen et al. | 267/294 |
| 7,201,367 | B2 * | 4/2007 | Wietharn | 267/141 |
| 8,317,173 | B2 * | 11/2012 | Kawada | 267/294 |
| 2010/0007069 | A1 | 1/2010 | Kawada et al. | |

FOREIGN PATENT DOCUMENTS

| | | |
|---|---|---|
| CN | 101535677 A | 9/2009 |
| JP | 2004-211837 A | 7/2004 |
| JP | 2006-64119 A | 3/2006 |
| JP | 2006-170394 A | 6/2006 |
| JP | 2008-75743 A | 4/2008 |
| JP | 2009-264582 A | 11/2009 |

OTHER PUBLICATIONS

International Search Report for PCT/JP2011/054780 dated Apr. 26, 2011.
Chinese Office Action issued in Chinese Application No. 201180012089.8 dated Dec. 4, 2013.

* cited by examiner

*Primary Examiner* — Christopher Schwartz
(74) *Attorney, Agent, or Firm* — Sughrue Mion, PLLC

(57) ABSTRACT

A vibration isolation structure is provided with a stress reduction section that can reduce the hydrostatic stress from tensional load along a stacking direction of portions of a composite laminated member corresponding to a first end side and a second end side in a shear direction orthogonal to the stacking direction to lower than the hydrostatic stress from tensional load along the stacking direction of other portions of the composite laminated member.

6 Claims, 10 Drawing Sheets

VIBRATION ISOLATION STRUCTURE

CROSS REFERENCE TO RELATED APPLICATIONS

This application is a National Stage of International Application No. PCT/JP2011/054780, filed on Mar. 2, 2011, which claims priority from Japanese Patent Application No. 2010-048381, filed on Mar. 4, 2010, the contents of all of which are incorporated herein by reference in their entirety.

TECHNICAL FIELD

The present invention relates to a vibration isolation structure having a composite laminated member of alternate stacked layers of plural hard plates and plural soft plates with viscoelastic characteristics. The vibration isolation structure is, for example, employed to support a vibration generating section such as an engine or a motor on a vibration receiving section such as a vehicle body and to attenuate and absorb vibration transmitted from the vibration generating section to the vibration receiving section.

BACKGROUND ART

In order to support a vibration generating section such as an engine on a vibration receiving section such as a vehicle body, and to attenuate and absorb vibration transmitted from the vibration generating section towards the vibration receiving section, known vibration isolation structures support the vibration generating section on the vibration receiving section by employing a composite laminated member formed from alternately stacked plural hard plates with rigid characteristics, for example steel plates, and plural soft plates with viscoelastic characteristics, made from for example rubber. Such vibration isolation structures attenuate and absorb vibration generated by the vibration generating section using the composite laminated member, and prevent amplification of vibration due to resonance by interposing the composite laminated member between the vibration generating section and the vibration receiving section. The level of vibration transmitted to the vibration receiving section is thereby reduced.

Such composite laminated bodies are made so as to be capable of comparatively large deformation in the horizontal direction in a state supporting the weight of the vibration generating section. The composite laminated member accordingly mainly undergoes shear deformation in the horizontal direction when vibration is received in a state in which the composite laminated member is supporting load from the vibration generating section, namely in a state in which positive pressure is placed on the composite laminated member. However, since the bottom end side of the vibration isolation structure is restricted by the vibration receiving section side, twisting deformation occurs in the composite laminated member when a vibration with large amplitude is input. Accompanying the occurrence of twisting deformation, a compression load acts on an amplitude direction first end portion of the composite laminated member, and tensional load acts on an amplitude direction second end portion. The compression load and the tensional load acting on the composite laminated member increase as the twisting deformation of the composite laminated member increases, namely as the amplitude of the input vibration increases. The free surface area of the composite laminated member is small compared to the comparatively large constrained face, therefore a concentration of hydrostatic stress occurs at a central portion of the constrained face when tensional load is acting, and damage can be easily sustained.

In the technology disclosed in Japanese Patent Application Laid-Open (JP-A) No. 2008-75743, a reduction to internal stress of a soft member is achieved by increasing the thickness of the soft member at portions where twisting deformation causes hydrostatic stress to become high, and by increasing the free surface area of the soft member. However, sufficient reduction to hydrostatic stress cannot be achieved merely by this increase in thickness, and further improvements are demanded in order to effectively suppress damage to the composite laminated member.

DISCLOSURE OF INVENTION

Technical Problem

In consideration of the above circumstances, the present invention provides a vibration isolation structure capable of effectively suppressing damage to a composite laminated member even when a vibration with large amplitude along a shear direction is input and twisting deformation occurs in the composite laminated member.

Solution to Problem

In order to achieve the above objective, a first aspect of the present invention is a vibration isolation structure including: a composite laminated member configured by alternating layers of plural hard plates with rigid properties and plural soft plates with viscoelastic characteristics; a first flange member and a second flange member that are provided at stacking direction outer sides of the composite laminated member so as to hold the composite laminated member therebetween, and that respectively couple the composite laminated member to a vibration generating section and a vibration receiving section; and a stress reduction section that reduces hydrostatic stress from tensional load along the stacking direction of portions of the composite laminated member corresponding to a first end side and a second end side in a shear direction orthogonal to the stacking direction, to an amount that is lower than hydrostatic stress from tensional load along the stacking direction for other portions of the composite laminated member.

In the vibration isolation structure of the first aspect, when vibration occurs in the vibration generating section, the vibration is attenuated by viscoelastic deformation of the plural soft plates configuring the composite laminated member, thereby reducing vibration transmitted to the vibration receiving section.

The present invention also includes the stress reduction section. The stress reduction section reduces hydrostatic stress from tensional load along the stacking direction of the composite laminated member at the first end side and at the second end side. Hence the hydrostatic stress acting on the composite laminated member can be reduced by disposing the direction of the first end side and the second end side to correspond to the amplitude direction of input vibration. Namely, the hydrostatic stress acting on the composite laminated member is reduced when a vibration of large amplitude along a direction orthogonal to the stacking direction of the composite laminated member (the shear direction) is input and twisting deformation occurs in the composite laminated member.

The stress reduction section is not provided at portions of the composite laminated member other than the first end side and the second end side, and so rigidity of the composite laminated member can be maintained.

In a vibration isolation structure of a second aspect of the present invention, the stress reduction section includes a configuration wherein a length from the first end side to the second end side of the soft plates is shorter than a length between edge portions at other locations of the soft plates.

By thus making the length from the first end side to the second end side of the soft plates shorter than the length between edge portions at other locations of the soft plates, the hydrostatic stress from tensional load of the composite laminated member at the first end side and the second end side can be reduced.

The vibration isolation structure of a third aspect of the present invention is the vibration isolation structure of the second aspect wherein the composite laminated member is formed in a circular shape as viewed along the stacking direction, and the stress reduction section includes a configuration wherein the first end side and the second end side of the soft plates have straight line shapes as viewed along the stacking direction.

When the composite laminated member is thus made in a circular shape as viewed along the stacking direction, the stress reduction section can be configured by forming the first end side and the second end side of the soft plates in a straight line shape as viewed along the stacking direction, namely by making flat faces opposite each other at the first end side and the second end side of the soft plates.

In a vibration isolation structure of a fourth aspect of the present invention the stress reduction section includes a configuration wherein the length from the first end side to the second end side of the hard plates is shorter than the length between edge portions at other locations of the hard plates.

By thus making the length from the first end side to the second end side of the hard plates shorter than the length between edge portions at other locations of the hard plates, the free surface area of the soft plates can be increased and the hydrostatic stress from tensional load at the first end side and the second end side of the composite laminated member can be reduced.

A vibration isolation structure of a fifth aspect of the present invention is the vibration isolation structure of the fourth aspect wherein the composite laminated member is formed in a circular shape as viewed along the stacking direction, and the stress reduction section includes a configuration wherein the first end side and the second end side of the hard plates have straight line shapes as viewed along the stacking direction.

When the composite laminated member is formed in a circular shape as viewed along the stacking direction, the stress reduction section can be configured by thus forming the first end side and the second end side of the hard plates with straight line shapes as viewed along the stacking direction, namely by making flat faces opposite each other at the first end side and the second end side of the hard plates.

In a vibration isolation structure of a sixth aspect of the present invention the stress reduction section is configured to include hollow portions in the soft plates at the first end side and the second end side.

The free surface area of the soft plates is increased by thus configuring the hollow portions in the first end side and the second end side, thereby enabling the hydrostatic stress from tensional load at the first end side and the second end side of the composite laminated member to be reduced.

A vibration isolation structure of a seventh aspect of the present invention further includes a displacement restricting member that has a higher rigidity than the composite laminated member with respect to tensional load along the stacking direction and that enables deformation in the shear direction orthogonal to the stacking direction, wherein the two stacking direction end portions of the displacement restricting member are respectively connected and fixed to the first flange member and the second flange member and restrict displacement of the composite laminated member in the stacking direction and the shear direction. In the seventh aspect of the present invention the composite laminated member is retained by the first flange member and the second flange member in a compressed state at a specific compression ratio along the stacking direction, and a resilient rebound force received by the first flange member and the second flange member from the composite laminated member in the compressed state is supported by the displacement restricting member.

In the vibration isolation structure of the seventh aspect of the present invention, the composite laminated member is retained by the first flange member and the second flange member in the compressed state at the specific compression ratio along the stacking direction, and the resilient rebound force received by the first flange member and the second flange member from the composite laminated member in the compressed state is supported by the displacement restricting member. Consequently, even when vibration with large amplitude along the shear direction is input and twisting deformation occurs in the composite laminated member and tensional load acts on the composite laminated member, the displacement restricting member has been placed in a constantly pulled state (tensioned state) due to the rebound force received from the composite laminated member between the first flange member and the second flange member. Hence, tensional load acts on the composite laminated member due to the input vibration and at the same time a portion of the tensional load is supported by the displacement restricting member, and the tensional stress occurring in the composite laminated member along the stacking direction can be reduced.

The displacement restricting member has a higher rigidity to load in the tension direction than the composite laminated member, and so even though an external force along the shear direction and tensional load acts on the composite laminated member, the displacement amount of the composite laminated member along the shear direction can be prevented from becoming too great, and the deformation of the composite laminated member in the tension direction can be reduced.

Advantageous Effects of Invention

According to the vibration isolation structure of the present invention as explained above, damage to a composite laminated member can be effectively suppressed even when vibration of large amplitude along the shear direction is input and twisting deformation has occurred in the composite laminated member.

BEST MODE FOR CARRYING OUT THE INVENTION

Explanation follows regarding a vibration isolation structure according to exemplary embodiments of the present invention, with reference to the drawings.

First Exemplary Embodiment

Vibration Isolation Structure Configuration

Figure 1:
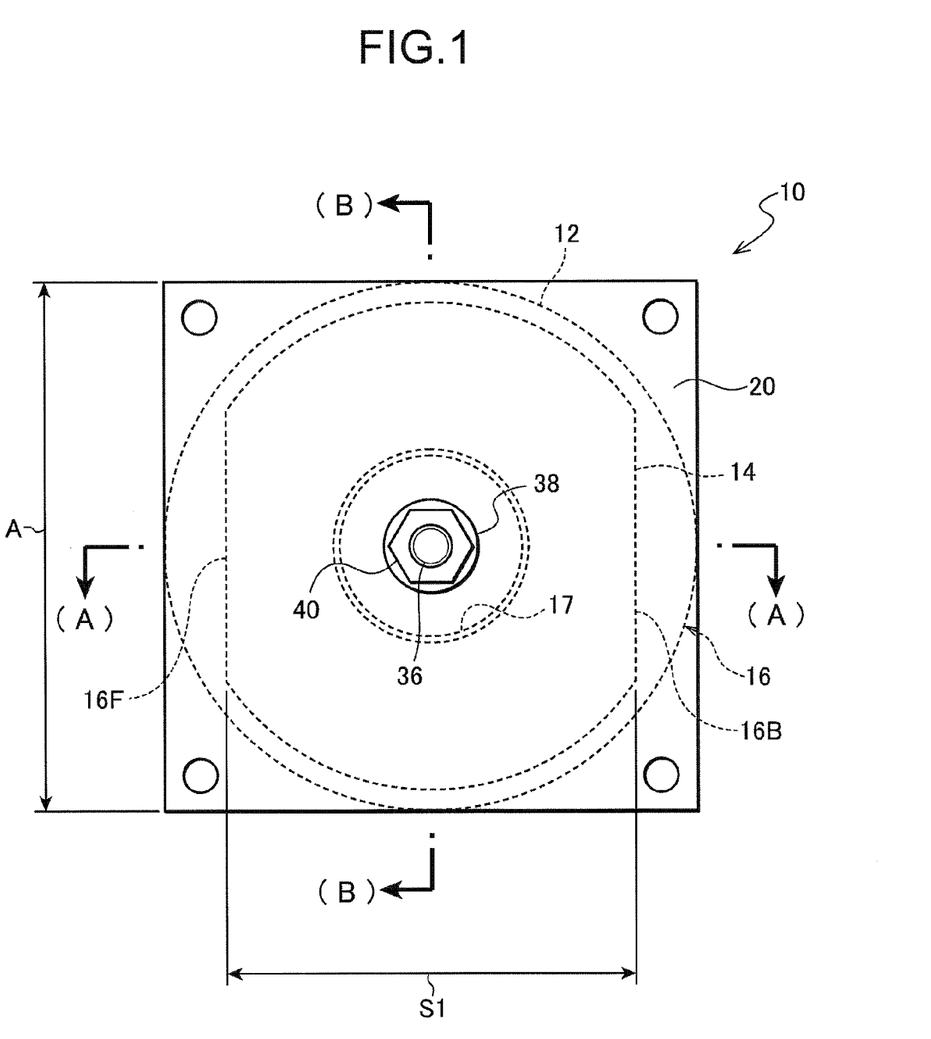
FIG. 1 is a plan view of a vibration isolation structure according to a first exemplary embodiment of the present invention.
Figure 2A:
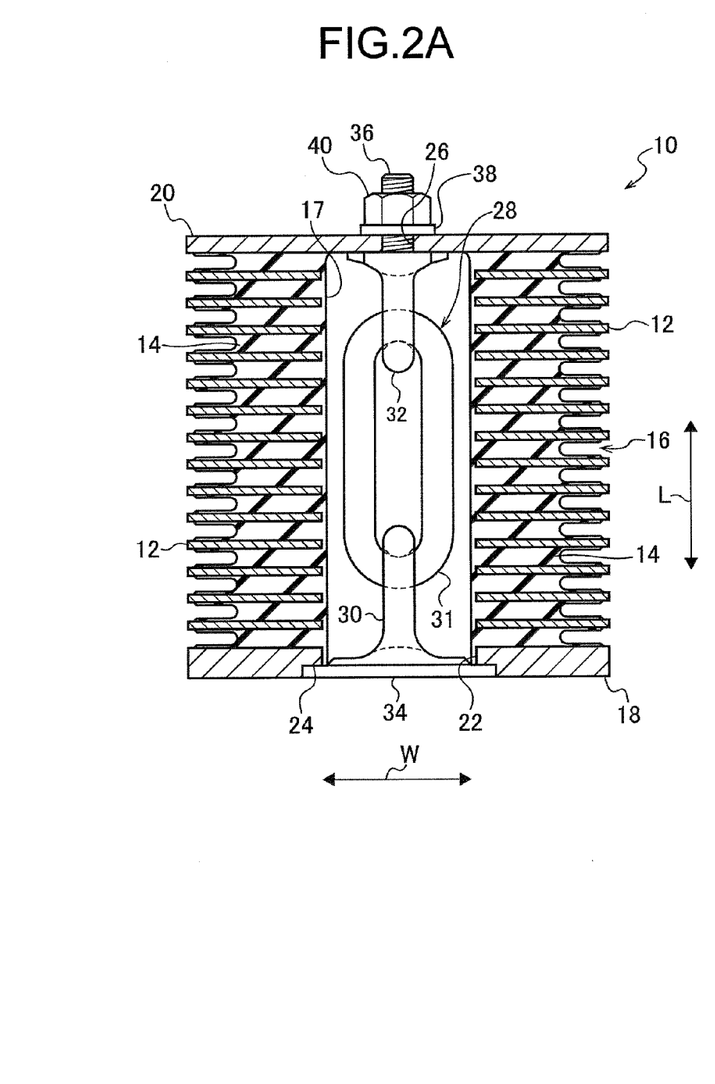
FIG. 2A is a cross-section taken along line A-A of FIG. 1 as viewed from the side of a vibration isolation structure according to the first exemplary embodiment of the present invention.
Figure 2B:
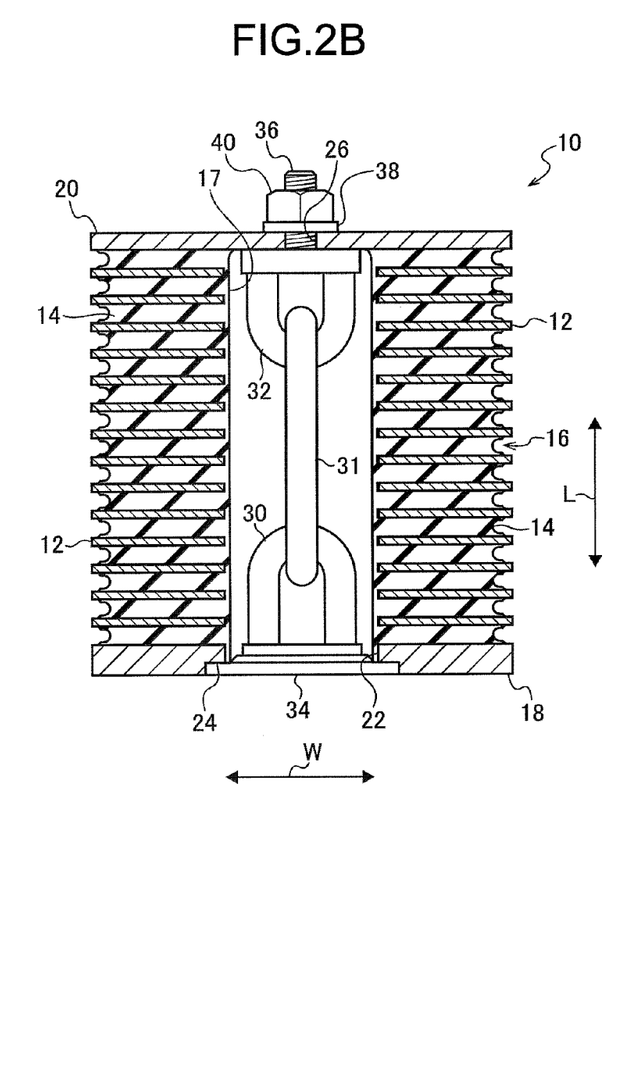
FIG. 2B is a cross-section taken along line B-B of FIG. 1 as viewed from the side of a vibration isolation structure according to the first exemplary embodiment of the present invention.

FIG. 1 and FIG. 2A and FIG. 2B illustrate a vibration isolation structure according to a first exemplary embodiment of the present invention. A vibration isolation structure 10 includes a laminated rubber body 16 that is a composite laminated member formed from alternately stacked hard plates 12 that can be considered in practice to be rigid bodies and rubber plates 14 with viscoelastic characteristics. The laminated rubber body 16 is formed in a thick substantially circular cylinder shape, with a circular column shaped hollow section 17 provided at a central face portion of the laminated rubber body 16 so as to pierce through in the laminated rubber body 16 stacking direction (the arrow L direction). The laminated rubber body 16 is configured by bonding together the hard plates 12 and the rubber plates 14 using vulcanization.

The hard plates 12 are circular plate shaped. When viewed along the stacking direction L of the laminated rubber body 16, the rubber plates 14 are formed with straight lines at a first end side 16F and a second end side 16B, with the remainder of the external periphery arc shaped to follow the hard plates 12. Namely, the rubber plates 14 are formed with a two face width profile of a circular shape from which the first end side 16F and the second end side 16B have been cut off. The stacked rubber plates 14 are accordingly configured with flat faces facing each other at the first end side 16F and the second end side 16B. The vibration isolation structure 10 is coupled to a vibration generating section such that the connecting direction between the first end side 16F and the second end side 16B (referred to below as the shear direction W) is the vibration amplitude direction of input vibration. Coupling is made, for example, such that the shear direction W is aligned with the vehicle front-rear direction.

According to such a configuration, in the rubber plates 14 a distance S1 between the first end side 16F and the second end side 16B is shorter than the distance between other end portions, namely than the diameter A of the hard plates 12. Due to the surface area of the rubber plates 14 constrained by the hard plates 12 hence being narrower in the shear direction W, the hydrostatic stress to tensional load acting on the rubber plates 14 at the first end side 16F or the second end side 16B (on the second end side 16B in FIG. 3) when twisting deformation occurs in the laminated rubber body 16 (see FIG. 3) is reduced. Note that the distance S1 is preferably 65% to 90% of the diameter A.

Examples of substances that may be employed for the hard plates 12 configuring the laminated rubber body 16 include for example, metal, ceramic, plastics, FRP, polyurethane, wood, paperboard, cement board and faced plywood. The rubber plates 14 are generally formed by molding raw materials of various types of vulcanized rubber. Examples of the types of rubber include ethylene propylene rubbers (EPR, EPDM), nitrile rubbers (NBR), butyl rubbers, halogenated butyl rubbers, chloroprene rubbers (CR), natural rubbers (NR), isoprene rubbers (IR), styrene butadiene rubbers (SBR) and butadiene rubbers (BR).

In the vibration isolation structure 10 a flange 18 and a flange 20 are respectively disposed at the laminated rubber body 16 stacking direction outside. The pair of flanges 18, are respectively fixed to the bottom end face and the top end face of the laminated rubber body 16, such as by vulcanization, so as to sandwich the laminated rubber body 16 along the stacking direction. The flanges 18, 20 are each configured by rectangular shaped metal plates. A circular shaped opening 22 is formed at a central portion in the bottom end side flange 18 adjacent to the hollow section 17 of the laminated rubber body 16, and an indented shaped insertion fit portion 24 is formed along the peripheral edge portion of the opening 22 at the bottom face of the flange 18. An insertion hole 26 is formed through a central portion of the top end side flange 20 with a smaller diameter than that of the hollow section 17 of the laminated rubber body 16.

A metal link chain 28 is disposed inside the hollow section 17 of the laminated rubber body 16 of the vibration isolation structure 10 as a displacement restricting member. The link chain 28 is disposed such that its length direction is aligned with the laminated rubber body 16 stacking direction, and the link chain 28 has rigidity and strength to tensional load in the stacking direction that is sufficiently higher than those of the laminated rubber body 16. The link chain 28 is configured from plural individual (three in the present exemplary embodiment) links 30, 31, 32 connected together in a line. The link chain 28 is easily capable of deforming overall in the shear direction W which is orthogonal to the stacking direction by bending between the respective links 30, 31, 32.

As shown in FIG. 2A and FIG. 2B, the link 30 positioned at the bottommost portion of the link chain 28 is fixed to a circular plate shaped lid member 34 disposed at the bottom end portion of the link 30, such as by welding. The link 32 positioned at the uppermost portion of the link chain 28 is fixed to a bolt shaft 36 disposed at the top end portion of the link 32 so as to project out upwards, such as by welding.

During assembly of the vibration isolation structure 10, the link chain 28 is inserted into the hollow section 17 of the laminated rubber body 16 through the opening 22 of the bottom end side flange 18. When this is performed, the bolt shaft 36 is inserted through the insertion hole 26 of the flange 20, and the leading end side of the bolt shaft 36 projects out externally from the flange 20. The lid member 34 closes off the opening 22 of the flange 18 and the outer peripheral portion of the lid member 34 is inserted into the insertion fit portion 24 of the flange 18. A washer 38 is fitted over the leading end portion of the bolt shaft 36 that projects out from the flange 20, and a nut 40 is then screwed on. The link chain 28 disposed inside the hollow section 17 accordingly has a bottom end portion that is connected and fixed to the flange 18 though the lid member 34, and has a top end portion that is connected and fixed to the flange 20 through the bolt shaft 36.

The laminated rubber body 16 is then placed in a compressed state to a specific compression ratio by pressing along the stacking direction by for example disposing in a press. The nut 40 that is screwed onto the bolt shaft 36 that projects out from the flange 20 is then tightened onto the bolt shaft 36 until there is no slack between the nut 40 and the flange 20 and until a specific fastening torque is generated. The laminated rubber body 16 is thereby retained by the flanges 18, 20 in a compressed state compressed by the specific compression ratio along the stacking direction. The resilient rebound force from the compressed-state laminated rubber body 16 borne by the flanges 18, 20 is supported by the link chain 28, such that the link chain 28 is in a pulled state (tensioned state) due to the rebound force.

When not supporting the vibration generating section, and not bearing compression load from the vibration generating section along the stacking direction, the laminated rubber body 16 is retained in a compressed state with a compression ratio greater than 0% up to 5% in the stacking direction. The laminated rubber body 16 is preferably retained in a compressed state with a compression ratio greater than 0% up to 2% in the stacking direction, and is more preferably retained in a compressed state with a compression ratio greater than 0% and in the vicinity of 0% in a range of +0.5% in the stacking direction.

However, in a vibration generating section supporting state, due to the laminated rubber body 16 bearing load (compression load) from the vibration generating section and being compressed in the stacking direction, the laminated rubber body 16 is maintained in a compressed state when the compression load is input from the vibration generating section along the stacking direction, compressed with a compression ratio along the stacking direction greater than 0% up to 20%. The laminated rubber body 16 is preferably maintained in a compressed state with a compression ratio along the stacking direction of greater than 0% and less than 10%, and more preferably maintained in a compressed state with a compression ratio along the stacking direction of greater than 0% and less than 5%.

Vibration Isolation Structure Operation

Explanation follows regarding operation of the vibration isolation structure according to the present exemplary embodiment.

The vibration isolation structure 10 of the present exemplary embodiment is, for example, interposed between a vibration generating section such as an engine or motor and a vibration receiving section such as a floor or vehicle body. The vibration isolation structure 10 supports the vibration generating section on the vibration receiving section. When doing so, the laminated rubber body 16 is coupled to the vibration generating section such that the shear direction W is along the vibration amplitude direction of for example the floor or the vehicle body. For example in the case of a vehicle body, coupling is made such that the shear direction W corresponds to the front-rear direction of the vehicle.

When vibration is generated from the vibration generating section, the laminated rubber body 16 mainly deforms in the shear direction W and attenuates and absorbs vibration such as by internal friction.

Figure 3:
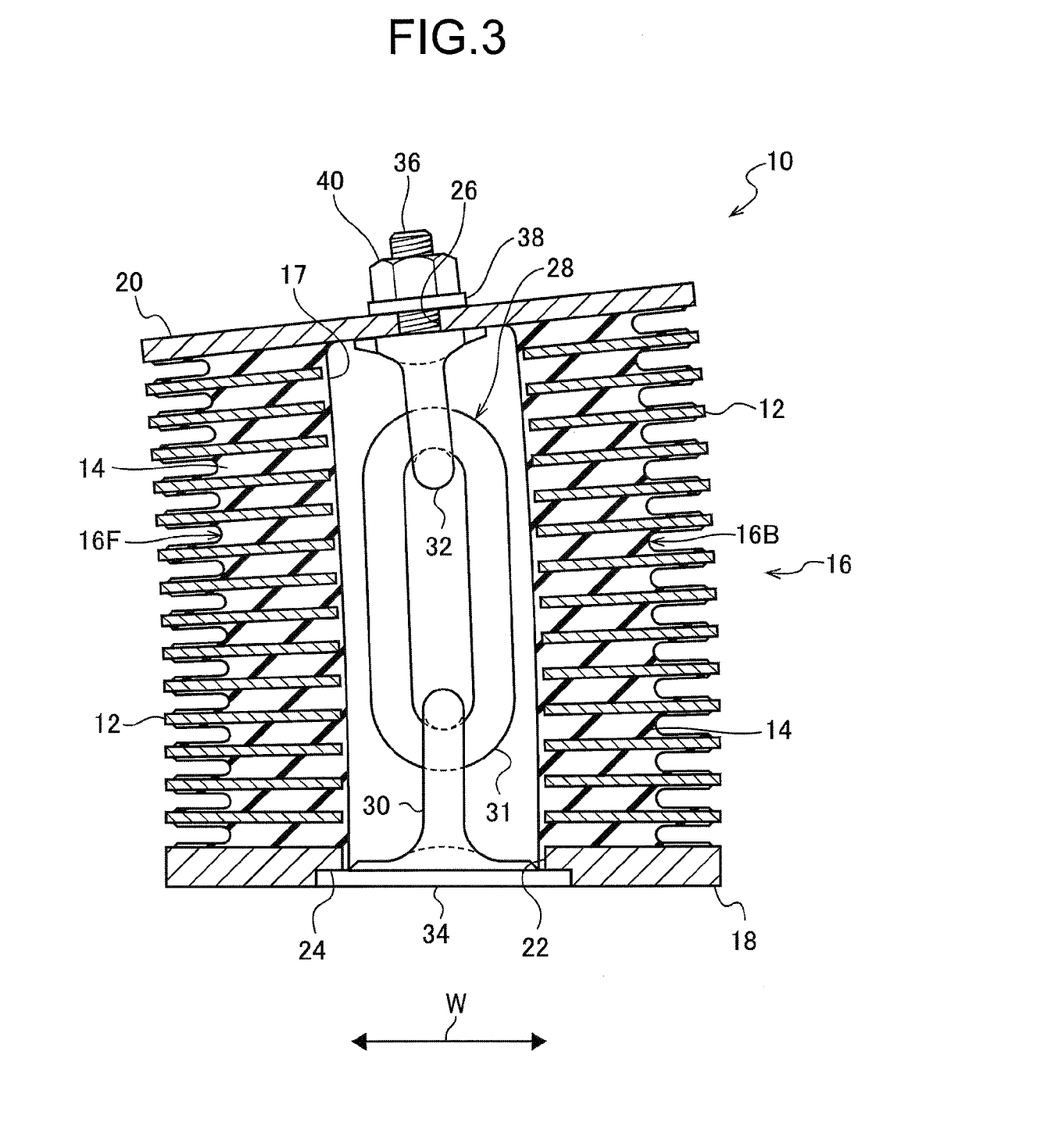
FIG. 3 is a cross-section viewed from the side illustrating a state in which a vibration of large amplitude in a shear direction has been input to a vibration isolation structure according to the first exemplary embodiment of the present invention and twisting deformation has occurred in a laminated rubber body.

When a vibration of large amplitude along the shear direction W is input, as shown in FIG. 3, twisting deformation occurs in the laminated rubber body 16 and the tensional load acts on the first end side 16F or the second end side 16B (the second end side 16B in FIG. 3) lying along the amplitude direction of the laminated rubber body 16. Since the link chain 28 has been placed in a constantly pulled state (tensioned state) due to the recovery force received from the laminated rubber body 16 between the flanges 18, 20, tensional load caused by vibration acts on the laminated rubber body 16, and at the same time a portion of the tensional load is supported by the link chain 28, thereby enabling the tensional stress occurring in the laminated rubber body 16 along the stacking direction to be reduced.

In the laminated rubber body 16 of the present exemplary embodiment the distance S1 from the first end side 16F to the second end side 16B of the rubber plates 14 is shorter than the diameter A of the laminated rubber body 16. Consequently, the hydrostatic stress to the tensional load acting on the first end side 16F or the second end side 16B (on the second end side 16B in FIG. 3) when twisting deformation occurs in the laminated rubber body 16 (see FIG. 3) can be reduced. As a result damage to the rubber plates 14 from input vibrations having large amplitude along the shear direction W can be effectively suppressed.

In the laminated rubber body 16 of the present exemplary embodiment, the outer edges of portions of the rubber plates 14 other than the first end side 16F and the second end side 16B are formed in arc shapes, and so hitherto attained rigidity can be maintained for these portions, and any drop in rigidity can be suppressed to a small amount.

In the vibration isolation structure 10 according to the present exemplary embodiment, the link chain 28 with the plural individual links 30, 31, 32 connected together in a line is employed as the displacement restricting member. However, for the displacement restricting body, as long there is a higher rigidity to tensional load along the stacking direction than that of the laminated rubber body 16 and deformation is possible in the shear direction, then configuration may be made employing a strand shaped member, such as metal strands, a metal wire of twisted metal strands, or a cord-like member such as a member formed from a resin with for example aramid fibers.

Second Exemplary Embodiment

Vibration Isolation Structure Configuration

Figure 4:
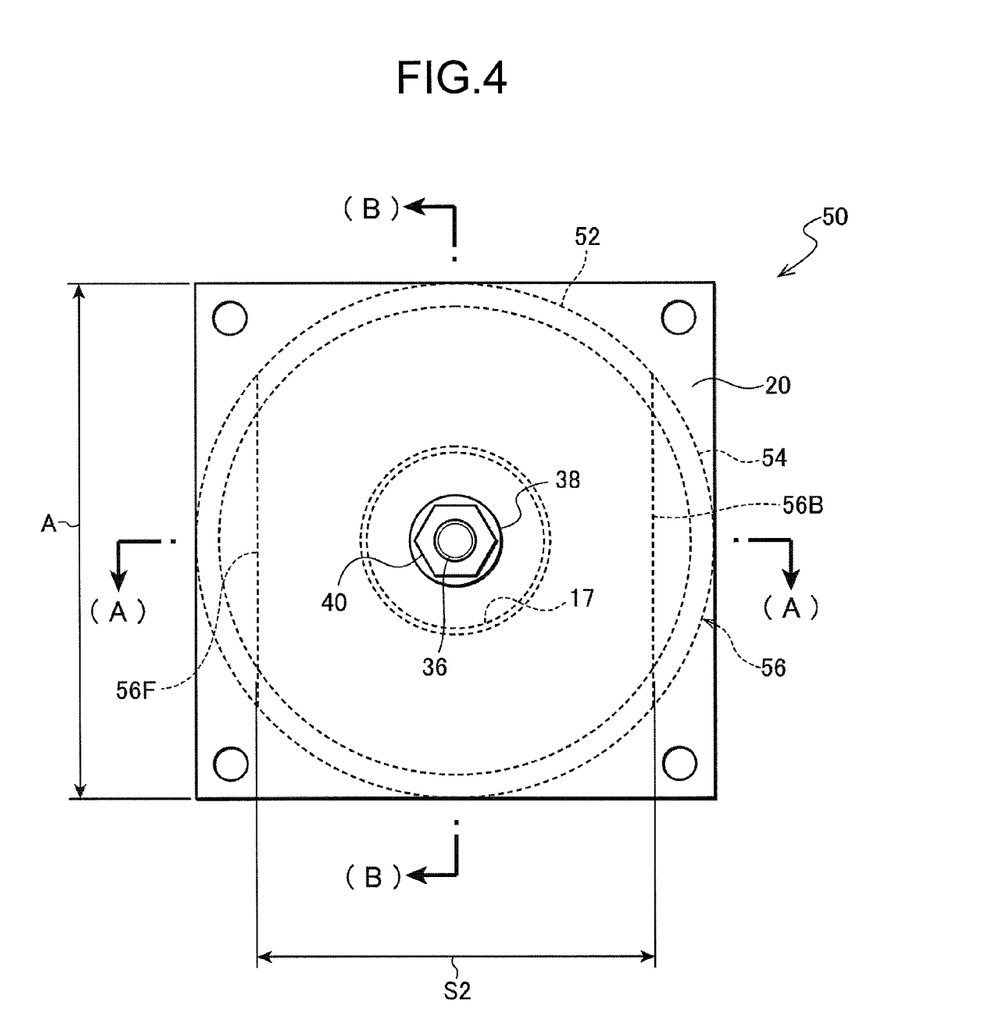
FIG. 4 is a plan view of a vibration isolation structure according to a second exemplary embodiment of the present invention.
Figure 5A:
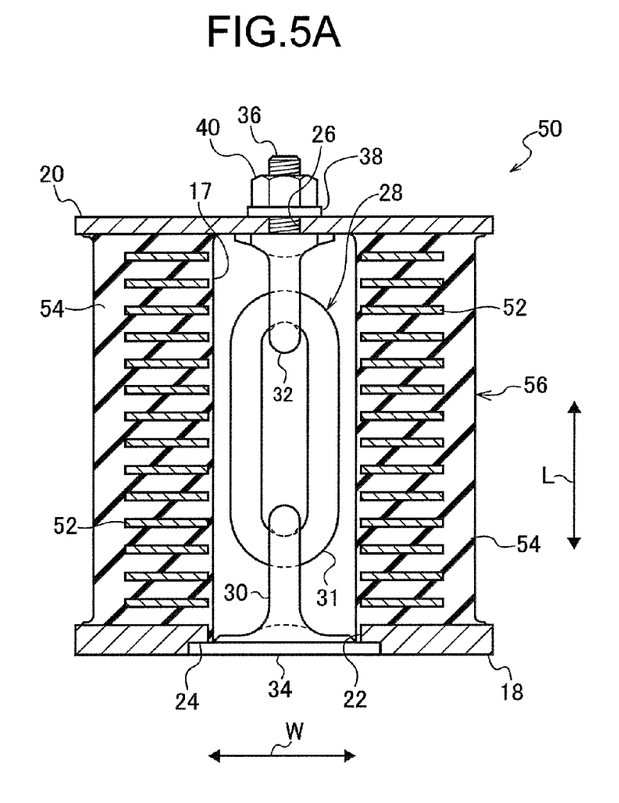
FIG. 5A is a cross-section taken along line A-A of FIG. 4 as viewed from the side of a vibration isolation structure according to the second exemplary embodiment of the present invention.
Figure 5B:
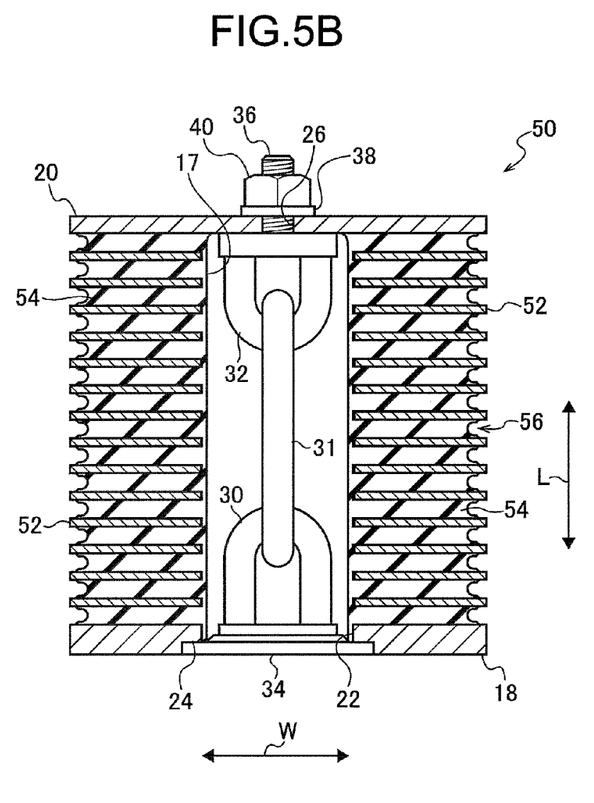
FIG. 5B is a cross-section taken along line B-B of FIG. 4 as viewed from the side of a vibration isolation structure according to the second exemplary embodiment of the present invention.
Figure 6:
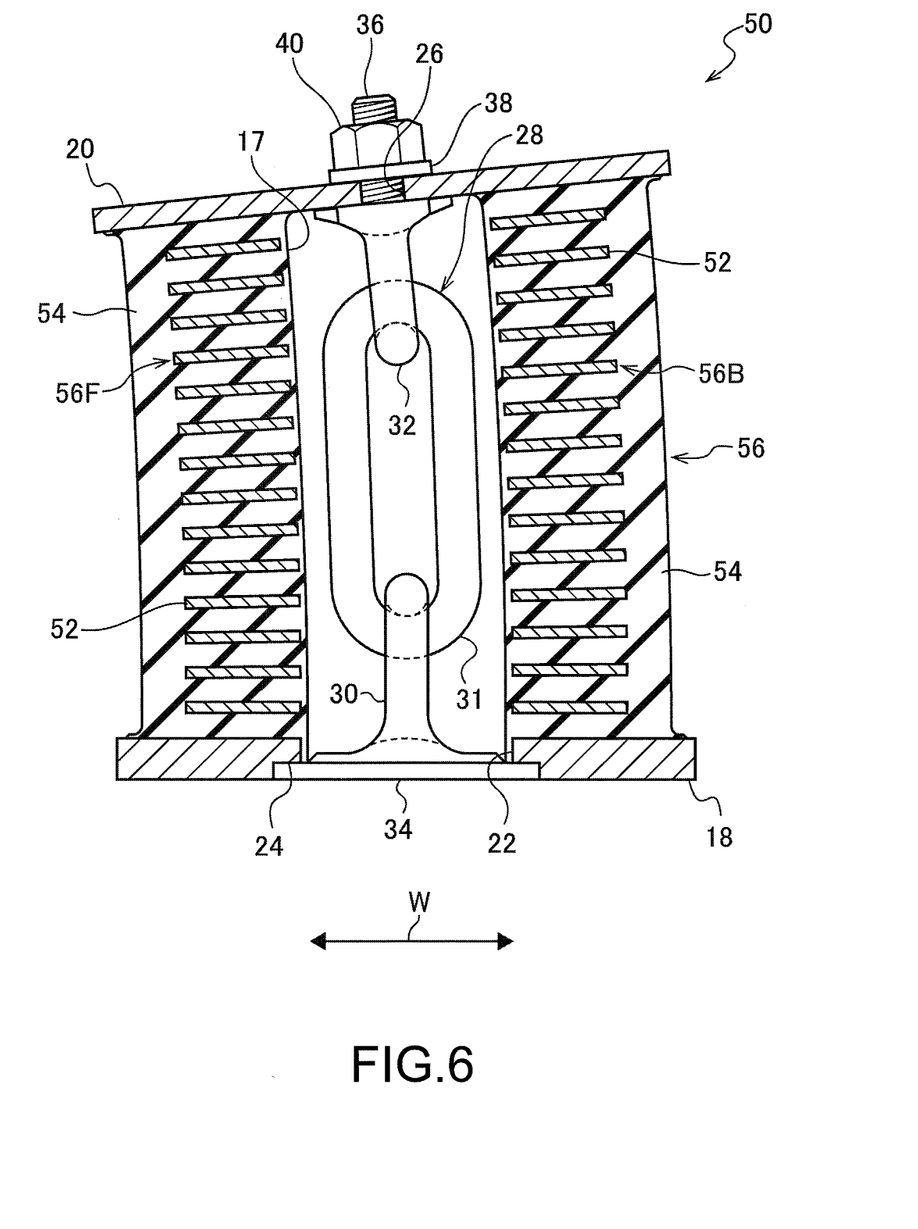
FIG. 6 is a cross-section viewed from the side illustrating a state in which a vibration of large amplitude in a shear direction has been input to a vibration isolation structure according to the second exemplary embodiment of the present invention and twisting deformation has occurred in a laminated rubber body.

FIG. 4 to FIG. 6 illustrate a vibration isolation structure according to a second exemplary embodiment of the present invention. Note that portions of a vibration isolation structure 50 according to the present exemplary embodiment similar to those of the vibration isolation structure 10 according to the first exemplary embodiment are allocated the same reference numbers and further explanation thereof is omitted.

The points where the vibration isolation structure 50 according to the present exemplary embodiment differ from the vibration isolation structure 10 according to the first exemplary embodiment are in that, as viewed from the stacking direction L, the hard plates are formed in a similar shape to the rubber plates 14 in the first exemplary embodiment, and the rubber plates are formed in a similar shape to the hard plates 12 of the first exemplary embodiment.

The vibration isolation structure 50 of the present exemplary embodiment is equipped with a laminated rubber body 56 that is a composite laminated member formed from alternately stacked hard plates 52 and rubber plates 54. Each of the hard plates 52 of the present exemplary embodiment, as viewed along a stacking direction L of the laminated rubber body 56, has a straight line first end side 56F and a second end side 56B, with the remainder of the outer edge configured in an arc shape. Namely, the hard plates 52 are formed with a two face width profile of a circular shape from which the first end side 56F and the second end side 56B have been cut off. The vibration isolation structure 50 is coupled to a vibration generating section such that the connecting direction between the first end side 56F and the second end side 56B (the shear direction W) lies along the amplitude direction of input vibration. Coupling is made, for example, such that the shear direction W is aligned with the vehicle front-rear direction.

According to such a configuration, a distance S2 in the hard plates 52 between the first end side 56F and the second end side 56B is shorter than the distance between other end portions, namely than a circular plate diameter A. The free surface area of the rubber plates 54 is accordingly widened in the shear direction W, and when twisting deformation occurs in the laminated rubber body 56 (see FIG. 6) the hydrostatic stress to the tensional load acting on the first end side 56F or the second end side 56B (on the second end side 56B in FIG. 6) is reduced.

Note that the distance S2 is preferably 65% to 90% of the diameter A.

The rubber plates 54 of the present exemplary embodiment are circular plate shaped as viewed along the stacking direction L, and are formed continuous in the stacking direction L at the first end side 56F and the second end side 56B so as to infill the cut-off portions of the hard plates 52.

Vibration Isolation Structure Operation

Explanation follows regarding operation of the vibration isolation structure of the present exemplary embodiment.

When vibration is generated from the vibration generating section, the laminated rubber body 56 mainly deforms in the shear direction W, and attenuates and absorbs vibration by for example internal friction. When vibration of large amplitude along the shear direction W is input, as shown in FIG. 6, twisting deformation occurs in the laminated rubber body 56, and tensional load acts on the first end side 56F or the second end side 56B (the second end side 56B in FIG. 6) that are disposed along the amplitude direction of the laminated rubber body 56. When this occurs, similarly to in the first exemplary embodiment, the link chain 28 has been placed in a tensioned state, and so a portion of the tensional load is supported by the link chain 28, enabling the tensional stress occurring in the laminated rubber body 56 along the stacking direction to be reduced.

In the laminated rubber body 56 in the present exemplary embodiment, the distance S2 in the hard plates 52 from the first end side 56F to the second end side 56B is shorter than the diameter A of the laminated rubber body 56. Consequently, when twisting deformation has occurred in the laminated rubber body 56 (see FIG. 6) the hydrostatic stress from tensional load acting on the first end side 56F or the second end side 56B (the second end side 56B in FIG. 6) can be reduced. As a result damage to the rubber plates 54 from input vibration with large amplitude along the shear direction W can be effectively suppressed.

In the laminated rubber body 56 of the present exemplary embodiment, portions of the rubber plates 54 other than the first end side 56F and the second end side 56B are configured with arc shaped outer edges, and so hitherto attained rigidity can be maintained for these portions, and any drop in rigidity can be made small.

Note that whereas in the first and second exemplary embodiments the distance (distance S1 or distance S2) of the shear direction W is only made shorter than the diameter A for one type of plate out of the hard plates or the rubber plates, the distance of the shear direction W may be made shorter than the diameter A for both the hard plates and the rubber plates.

Third Exemplary Embodiment

Vibration Isolation Structure Configuration

Figure 7:
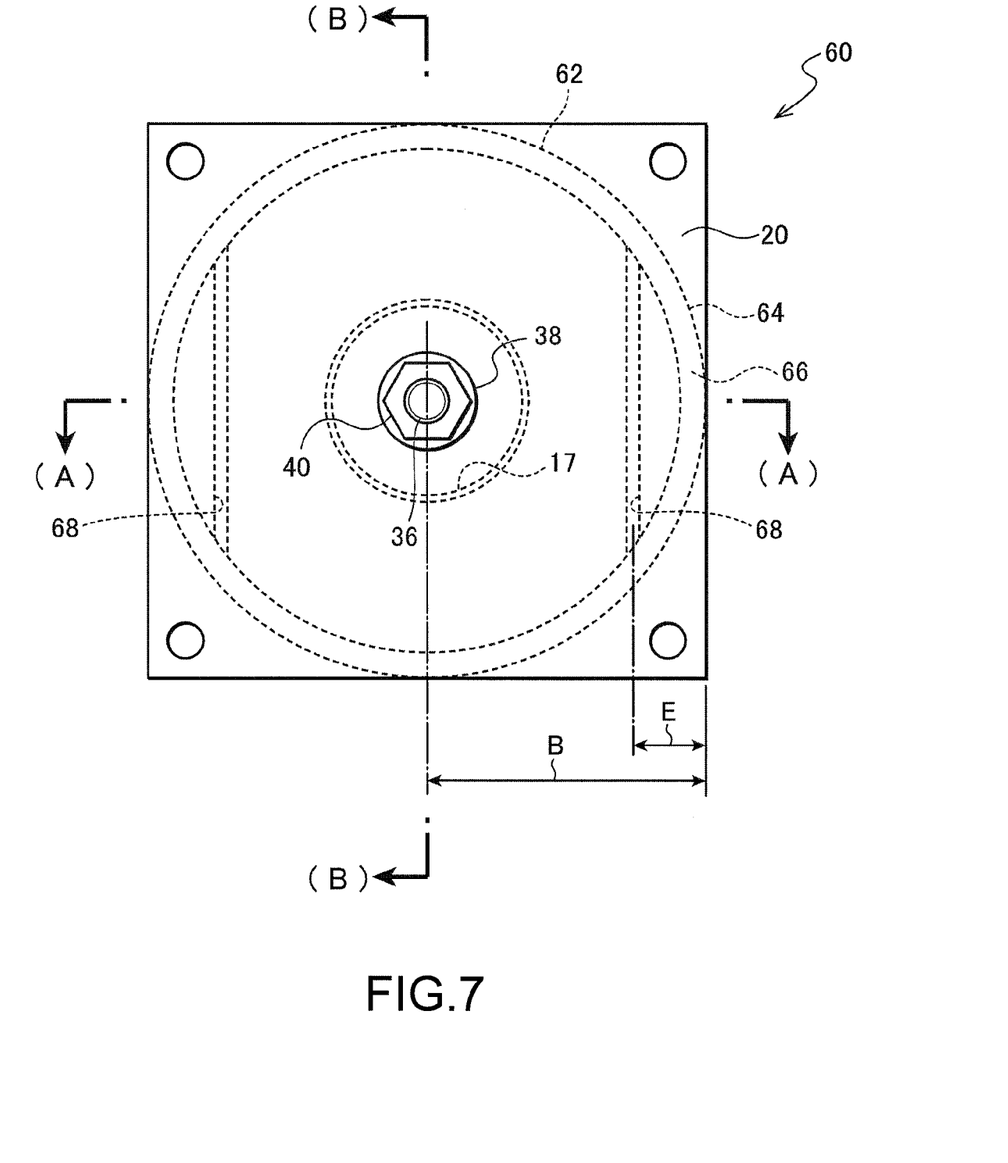
FIG. 7 is a plan view of a vibration isolation structure according to a third exemplary embodiment of the present invention.
Figure 8A:
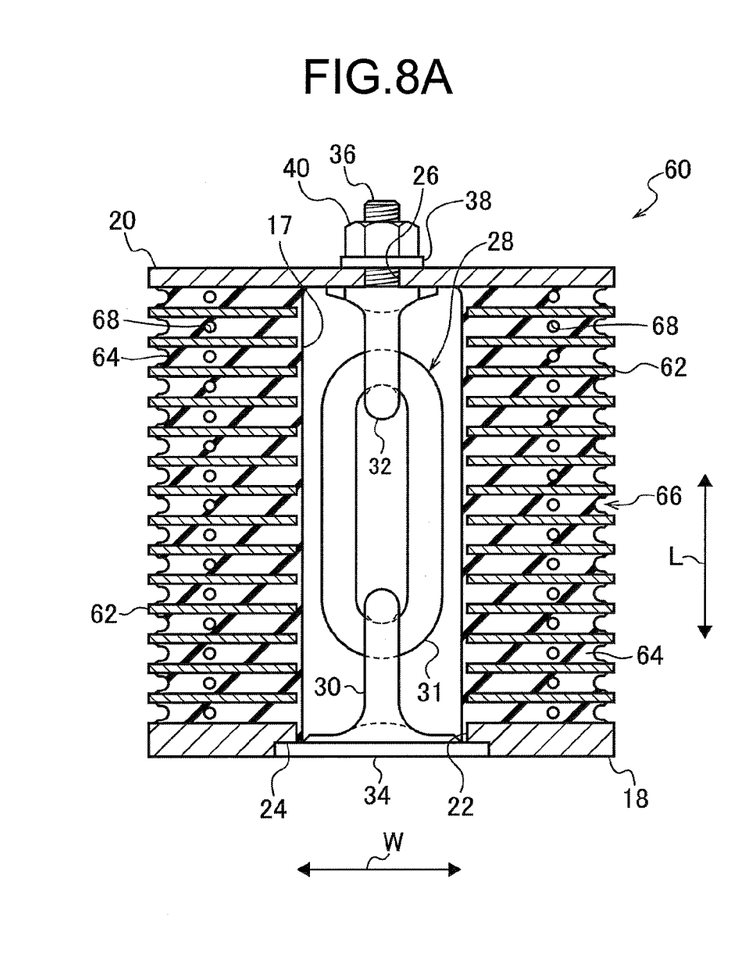
FIG. 8A is a cross-section taken along line A-A of FIG. 7 as viewed from the side of a vibration isolation structure according to the third exemplary embodiment of the present invention.
Figure 8B:
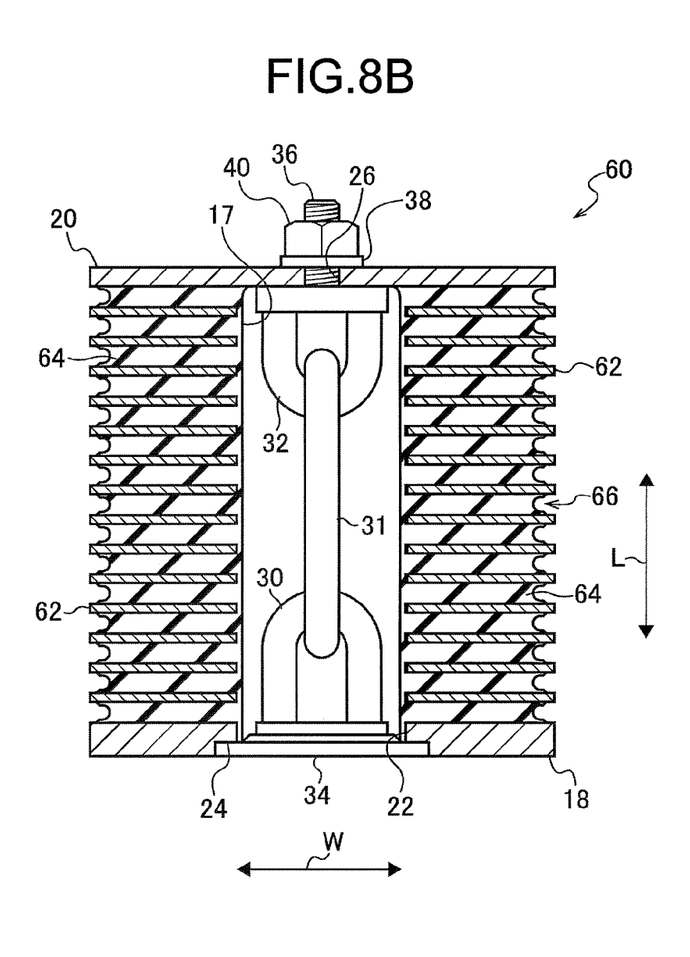
FIG. 8B is a cross-section taken along line B-B of FIG. 7 as viewed from the side of a vibration isolation structure according to the third exemplary embodiment of the present invention.
Figure 9:
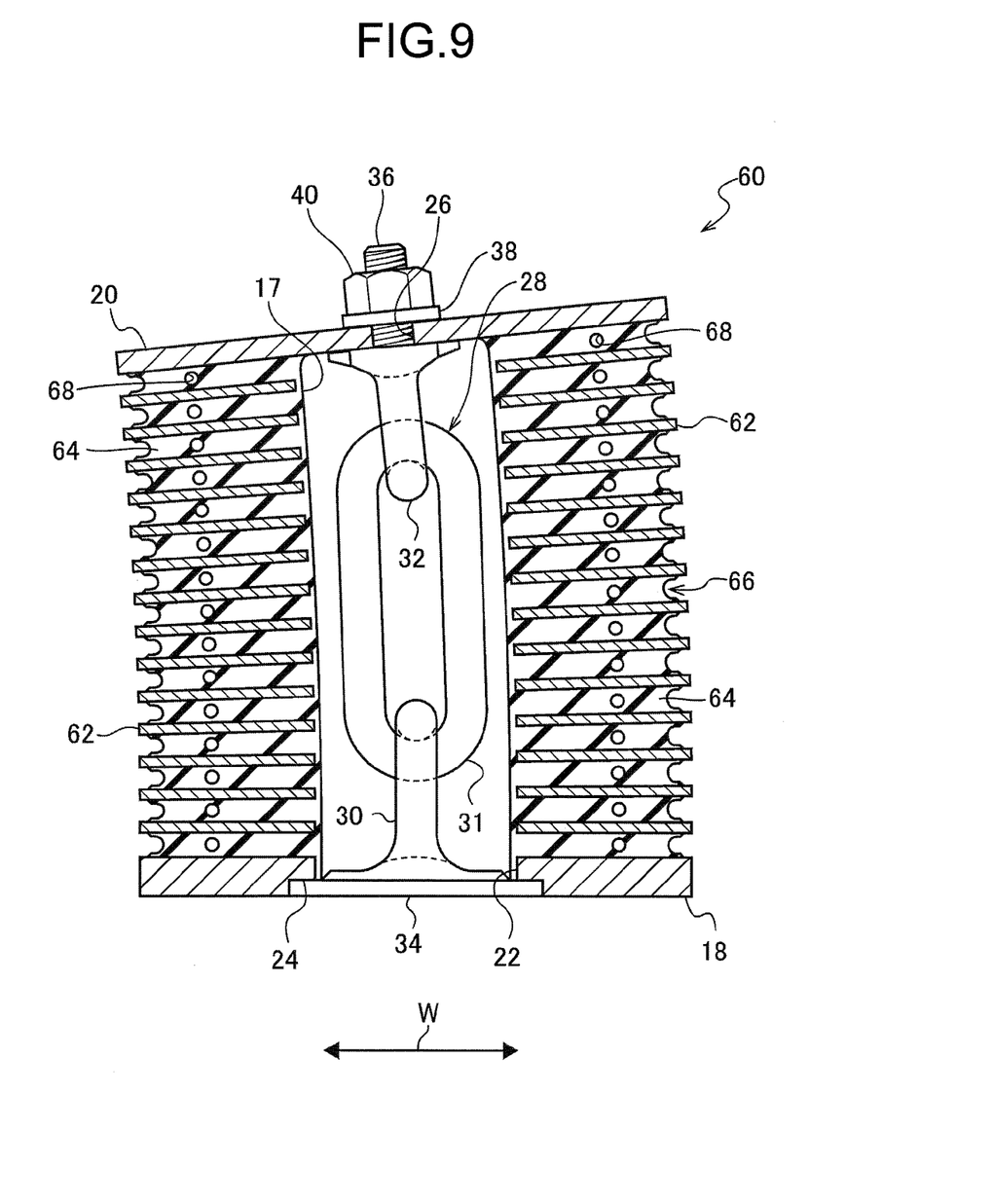
FIG. 9 is a cross-section viewed from the side illustrating a state in which a vibration of large amplitude in a shear direction has been input to a vibration isolation structure according to the third exemplary embodiment of the present invention and twisting deformation has occurred in a laminated rubber body.

FIG. 7 to FIG. 9 illustrate a vibration isolation structure according to a third exemplary embodiment of the present invention. Note that portions of a vibration isolation structure 60 according to the present exemplary embodiment similar to those of the vibration isolation structures 10, 50 of the first and second exemplary embodiments are allocated the same reference numerals and further explanation thereof is omitted.

The points in which the vibration isolation structure 60 according to the present exemplary embodiment differs from the vibration isolation structure 10 according to the first exemplary embodiment are in that, as viewed along the stacking direction L, the rubber plates are formed in a similar shape to the hard plates 12 of the first exemplary embodiment, and the rubber plates are configured with hollow portions.

The vibration isolation structure 60 according to the present exemplary embodiment is equipped with a laminated rubber body 66 that is a composite laminated member formed from alternately stacked hard plates 62 and rubber plates 64. Each of the hard plates 62 and the rubber plates 64 of the present exemplary embodiment is formed in a circular plate shape.

In each of the rubber plates 64, as viewed along a stacking direction L of the laminated rubber body 66, hollow portions 68 are formed along a direction orthogonal to the shear direction W at a first end side 66F and the second end side 66B. The hollow portions 68 are formed so as to pass through the rubber plates 64. The vibration isolation structure 60 is coupled to a vibration generating section such that the direction connecting the first end side 66F and the second end side 66B (shear direction W) lies along the amplitude direction of input vibration. Coupling is made, for example, such that the shear direction W is aligned with the vehicle front-rear direction. By adopting such a configuration, the free surface area of the rubber plates 64 is accordingly widened in the shear direction W, and when twisting deformation occurs in the laminated rubber body 66 (see FIG. 9) the hydrostatic stress to the tensional load acting at the first end side 66F or the second end side 66B (on the second end side 66B in FIG. 9) is reduced.

The positions where the hollow portions 68 are formed is preferably in a range of 30% to 60% of a radius B from the outer periphery of the rubber plates 64, at a distance E from the outer periphery. This is because the hydrostatic stress cannot be effectively lowered when the hollow portions 68 are configured further to the peripheral outside than 30% of the radius B, or when configured further to the peripheral inside than 60% of the radius B.

Vibration Isolation Structure Operation

Explanation follows regarding operation of the vibration isolation structure of the present exemplary embodiment.

When vibration is generated from the vibration generating section, the laminated rubber body 66 mainly deforms in the shear direction W, and attenuates and absorbs vibration by for example internal friction. When vibration of large amplitude along the shear direction W is input, as shown in FIG. 9, twisting deformation occurs in the laminated rubber body 66, and tensional load acts on the first end side 66F or the second end side 66B (the second end side 66B in FIG. 9) along the amplitude direction of the laminated rubber body 66. When this occurs, similarly to in the first exemplary embodiment, the link chain 28 has been placed in a tensioned state, and so a portion of the tensional load is supported by the link chain 28, enabling the tensional stress occurring in the laminated rubber body 66 along the stacking direction to be reduced.

In the laminated rubber body 66 in the present exemplary embodiment, the hollow portions 68 are formed in the rubber plates 64 at the first end side 66F and the second end side 66B. Consequently, when twisting deformation has occurred in the laminated rubber body 66 (see FIG. 9) the hydrostatic stress from tensional load acting on the first end side 66F or the second end side 66B (the second end side 66B in FIG. 9) can be reduced. As a result damage to the rubber plates 64 from input vibration with large amplitude along the shear direction W can be effectively suppressed.

The rubber plates 64 of the present exemplary embodiment are also formed further to the radial direction outside than the hollow portions 68, and so any drop in rigidity can be made small while still reducing the hydrostatic stress in the manner described above.

In the present exemplary embodiment the hollow portions 68 are formed along a direction orthogonal to the shear direction W, however hollow portions may be formed in another direction, for example formed in a direction along the shear direction W, or a radial direction to reduce the hydrostatic stress.

In the first to the third exemplary embodiments, the chain 28 is disposed between the flanges 18, 20, and the laminated rubber bodies 16, 56, 66 are maintained in a compressed state, however configuration may be made without the chain 28.

Example

Figure 10:
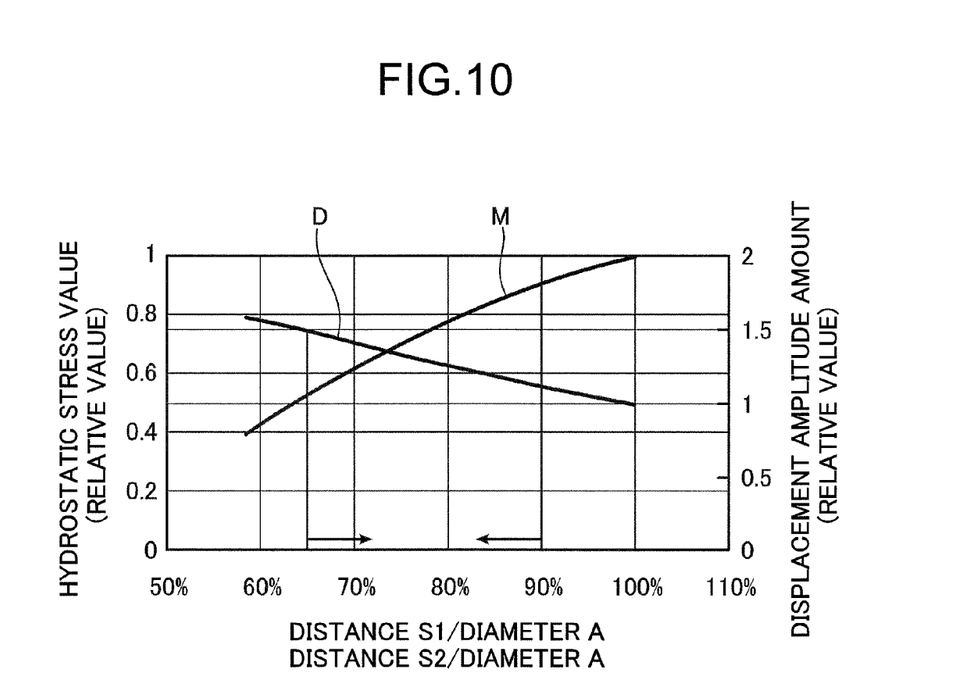
FIG. 10 is a graph illustrating relationships between hydrostatic stress values and displacement magnification amounts, and between distance from a first end portion to a second end of a rubber plate (hard plate) in vibration isolation structures of exemplary embodiments of the present invention.

In order to confirm the advantageous effects of the vibration isolation structures of the first exemplary embodiment and the second exemplary embodiment described above, the distance S1 of the rubber plates between the first end side and the second end side, and the distance S2 of the hard plates between the first end side and the second end side, are varied, and hydrostatic stress values and displacement magnification amounts of the vibration isolation structures are measured. FIG. 10 is a graph illustrating such results. The first and the second exemplary embodiments both obtain substantially the same advantageous effects. The distance S1 and the distance S2 are expressed as a proportion of the diameter A (distance S1/diameter A, distance S2/diameter A), the hydrostatic stress values and the displacement magnification amounts are shown as relative values, with those of a circular shape rubber plate (or hard plate) (distance S1/diameter A=100%, distance S2/diameter A=100%) taken as 1. The hydrostatic stress value M increases and the displacement magnification amount D gets smaller as the distance S1/diameter A and the distance S2/diameter A increases.

As shown in the graph of FIG. 10, the hydrostatic stress is lowered by 10% and the displacement magnification amount increases by 10% in the vicinity of 90% for the distance S1/diameter A (the distance S2/diameter A). The increase in displacement magnification amount exceeds 50% at 65% or less for the distance S1/diameter A (the distance S2/diameter A). It is accordingly preferable to set the distance S1/diameter A (the distance S2/diameter A) at 65% to 90% in order to lower the hydrostatic stress while still securing an appropriate displacement amount.

The invention claimed is:

1. A vibration isolation structure comprising:
   a composite laminated member configured by alternating layers of a plurality of hard plates with rigid properties and a plurality of soft plates with viscoelastic characteristics;
   a first flange member and a second flange member that are provided at stacking direction outer sides of the composite laminated member so as to hold the composite laminated member therebetween, and that respectively couple the composite laminated member to a vibration generating section and a vibration receiving section; and
   a stress reduction section that reduces hydrostatic stress from tensional load along the stacking direction of portions of the composite laminated member corresponding to a first end side and a second end side in a shear direction orthogonal to the stacking direction, to an amount that is lower than hydrostatic stress from tensional load along the stacking direction for other portions of the composite laminated member,
   wherein a length from the first end side to the second end side of the soft plates in a shear direction orthogonal to the stacking direction of the soft plates is shorter than a length between edge portions at other locations of the soft plates,
   wherein:
   the stress reduction section comprises a configuration wherein a length from the first end side to the second end side of the soft plates is shorter than a length between edge portions at other locations of the soft plates,
   the composite laminated member is formed in a circular shape as viewed along the stacking direction; and
   the stress reduction section comprises a configuration wherein the first end side and the second end side of the soft plates have straight line shapes as viewed along the stacking direction and outer edges of the stress reduction section not including the first end side and the second end side are arc-shaped.

2. The vibration isolation structure of claim 1, wherein the stress reduction section comprises a configuration wherein the length from the first end side to the second end side of the hard plates is shorter than the length between edge portions at other locations of the hard plates.

3. The vibration isolation structure of claim 2, wherein:
the composite laminated member is formed in a circular shape as viewed along the stacking direction; and
the stress reduction section comprises a configuration wherein the first end side and the second end side of the hard plates have straight line shapes as viewed along the stacking direction.

4. The vibration isolation structure of claim 1, wherein:
the stress reduction section is configured to include hollow portions in the soft plates at the first end side and the second end side.

5. The vibration isolation structure of claim 1, further comprising:
a displacement restricting member that has a higher rigidity than the composite laminated member with respect to tensional load along the stacking direction and that enables deformation in the shear direction orthogonal to the stacking direction, wherein two stacking direction end portions of the displacement restricting member are respectively connected and fixed to the first flange member and the second flange member and restrict displacement of the composite laminated member in the stacking direction and the shear direction,
wherein the composite laminated member is retained by the first flange member and the second flange member in a compressed state at a specific compression ratio along the stacking direction, and a resilient rebound force received by the first flange member and the second flange member from the composite laminated member in the compressed state is supported by the displacement restricting member.

6. A vibration isolation structure comprising:
a composite laminated member configured by alternating layers of a plurality of hard plates with rigid properties and a plurality of soft plates with viscoelastic characteristics;
a first flange member and a second flange member that are provided at stacking direction outer sides of the composite laminated member so as to hold the composite laminated member therebetween, and that respectively couple the composite laminated member to a vibration generating section and a vibration receiving section; and
a stress reduction section that reduces hydrostatic stress from tensional load along the stacking direction of portions of the composite laminated member corresponding to a first end side and a second end side in a shear direction orthogonal to the stacking direction, to an amount that is lower than hydrostatic stress from tensional load along the stacking direction for other portions of the composite laminated member,
wherein the first end side and the second end side of the hard plates in a shear direction orthogonal to the staking direction of the hard plates have straight line shapes as viewed from the stacking direction and other outer edges of the hard plates have an arc shape with a two faced width profile.

* * * * *